United States Patent [19]
Novak

[11] 4,389,976
[45] Jun. 28, 1983

[54] ANIMAL FEEDING APPARATUS

[76] Inventor: Thaddeus Novak, 5037 Curtis, Dearborn, Mich. 48126

[21] Appl. No.: 257,494

[22] Filed: Apr. 24, 1981

[51] Int. Cl.³ .............................................. A01K 5/00
[52] U.S. Cl. ........................................................ 119/62
[58] Field of Search .................... 119/51.12, 55, 62, 76

[56] References Cited

U.S. PATENT DOCUMENTS

| | | | |
|---|---|---|---|
| 55,356 | 6/1866 | Patric | 119/76 |
| 1,116,958 | 11/1914 | Tuttle | 119/55 |
| 1,454,352 | 5/1923 | Thompson | 119/55 |
| 2,528,742 | 11/1950 | Coffing | 119/51.12 |
| 2,709,988 | 6/1955 | Hatcher | 119/62 |
| 3,121,419 | 2/1964 | Gillespie | 119/62 |
| 3,301,219 | 1/1967 | Hellekson | 119/55 |
| 4,044,723 | 8/1977 | Fitzpatrick | 119/61 |

*Primary Examiner*—Robert P. Swiatek
*Attorney, Agent, or Firm*—Gifford, VanOphem, Sheridan & Sprinkle

[57] ABSTRACT

An animal feeding device which supports feeding dishes at an elevated level and which protects the food in the dishes comprises a housing having a roof portion which extends over a raised shelf. The shelf includes apertures into which the bottom of the feeding dishes are inserted. A cover overlays the shelf and is pivotally secured in the housing so that it can expose the feeding dishes. A treadle mechanism operates the cover and the housing preferably includes a handle for carrying and a light bulb for illuminating and heating the feeding dishes.

13 Claims, 4 Drawing Figures

ANIMAL FEEDING APPARATUS

BACKGROUND OF THE INVENTION

I. Field of the Invention

The present invention relates generally to devices for holding animal feeding bowls and, more particularly, to such a device comprising an enclosure in which the food bowls are normally covered until the animal enters the enclosure for feeding.

II. DESCRIPTION OF THE PRIOR ART

Previously known animal feeding apparatus often employ a raised shelf to raise the height of the food bowl so that it is conveniently accessible to the animal while standing. It has also been known to provide such feeders with a normally closed cover which opens only when the animal desires to feed. Typically, such devices include a treadle upon which the animal stands in order to open the cover on the food bowls. Such a device is shown in U.S. Pat. No. 3,301,219 to Hellekson and U.S. Pat. No. 3,121,419 to Gillespie. However, such devices are not well adapted for use outdoors for the reason that the food and the animal are not protected from wind, rain or snow when the animal is feeding. Thus, during inclement weather, feeding is uncomfortable. Moreover, such exposure can cause spoilage of materials within the food bowls. In addition, these previously known devices are quite cumbersome and thus not easy to transport from place to place. Furthermore, these devices are not provided with any means for preventing the food from freezing during extremely cold weather. In addition, none of the previously known animal feeding apparatus provides a means for preventing or blocking the animal's access to the food bowls.

SUMMARY OF THE PRESENT INVENTION

The present invention overcomes the above-mentioned disadvantages by providing an animal feeding apparatus comprising an enclosure housing having a top wall and side walls in which a raised support shelf including food container receiving means is disposed below a normally closed cover. The cover is actuated by a treadle mechanism so that when the animal approaches the food shelf, the cover moves away from and exposes the contents of the food shelf. Nevertheless, the food shelf is protected from rain and the like even during feeding by the top wall which extends over the shelf.

In addition, the treadle mechanism comprises a ramp member hingedly secured to one end to the end of a pivoting floor panel. The ramp extends outwardly from the housing and provides a continuous walkway to the normally raised edge portion of the pivoting floor panel. Nevertheless, the ramp member can be folded into the housing in order to prevent access to the food shelf and in order to make the unit compact for transportation or storage.

Preferably, the feeding apparatus is provided with means for stably supporting the housing on a ground surface. In addition, the top wall preferably includes a handle to permit easy transportation of the animal feeder. These and additional features of the present invention will be readily understood from the following detailed description.

BRIEF DESCRIPTION OF THE DRAWING

The present invention will be better understood by reference to the following detailed description when read in conjunction with the accompanying drawing in which like reference characters refer to like parts throughout the several views and in which.

DETAILED DESCRIPTION OF A PREFERRED EMBODIMENT OF THE PRESENT INVENTION

Figure 1:
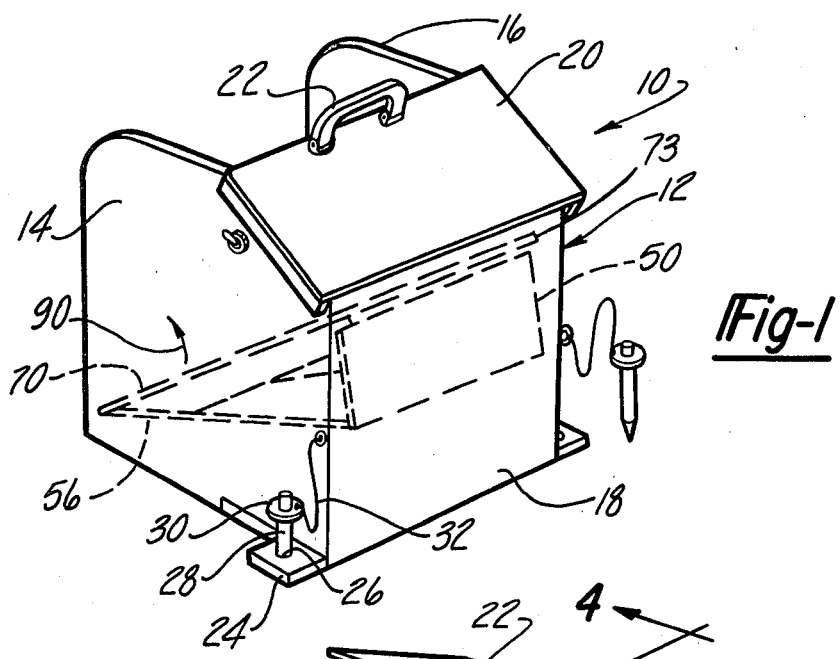
FIG. 1 is a rear perspective view of the animal feeding apparatus of the present invention showing the entrance ramp in its folded, inaccessible position.

Referring first to FIG. 1, the animal feeding apparatus 10 of the present invention is thereshown comprising a housing 12 having side walls 14 and 16, back wall 18 and top wall 20. The top wall 20 extends across the side walls 14 and 16 from the back wall 18 and is preferably inclined upwardly from the back wall 18. As shown, the top wall 20 ends short of the front of the housing 12, preferably terminating near the center of the housing 12 and the uppermost end of the wall 20 includes a handle 22 so that the housing is balanced when lifted and easily transported from place to place.

The housing 12 also includes means for stationarily mounting the housing to a ground surface. Preferably, a laterally extending flange 24 extends outwardly from each wall 14 and 16 and includes an aperture 26 therethrough. A fastener, such as an elongated spike 28 is inserted through the aperture 26. As shown, the spike 28 includes a radially extending flange 30 which retains the flange 24 against the ground when the spike 28 is pounded through the aperture into the ground. A retaining cord 32 secures the spike 28 to the housing 12 so that all necessary parts are kept intact when the device is being transported.

Figure 2:
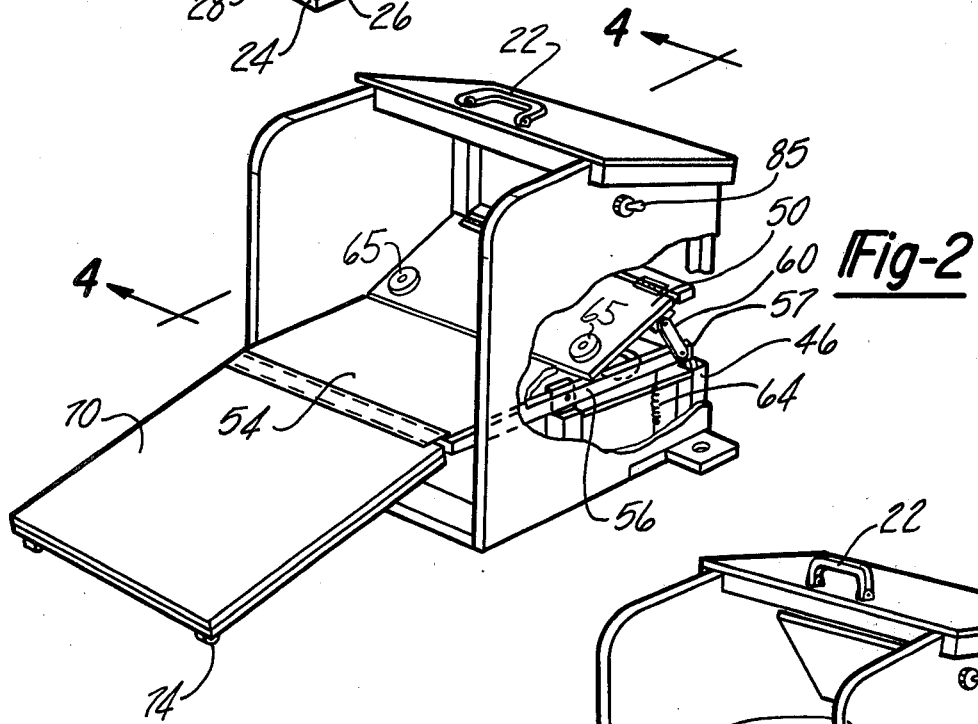
FIG. 2 is a front perspective view of the animal feeding apparatus of the present invention showing the entrance ramp in its accessible but normal spring biased position.
Figure 3:
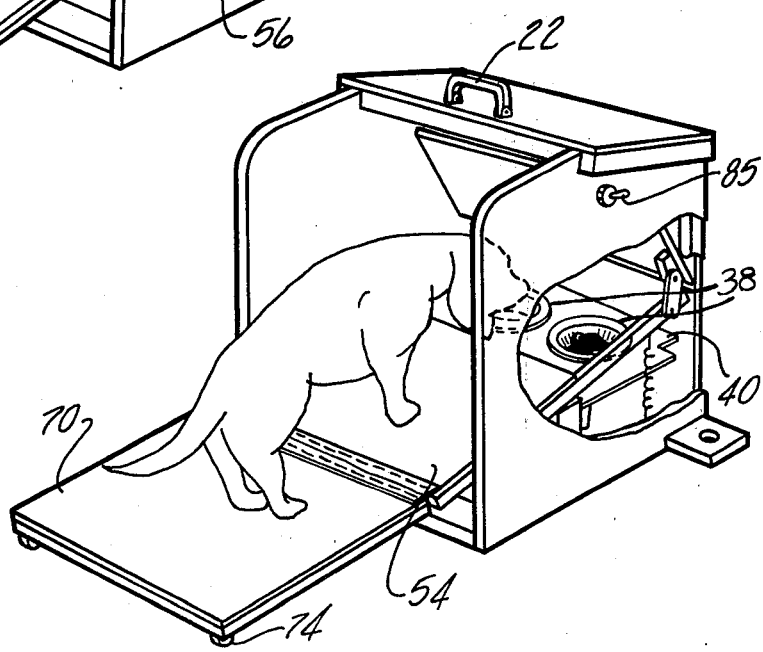
FIG. 3 is a perspective view similar to FIG. 2 but showing the ramp in its operative position when occupied by an animal.
Figure 4:
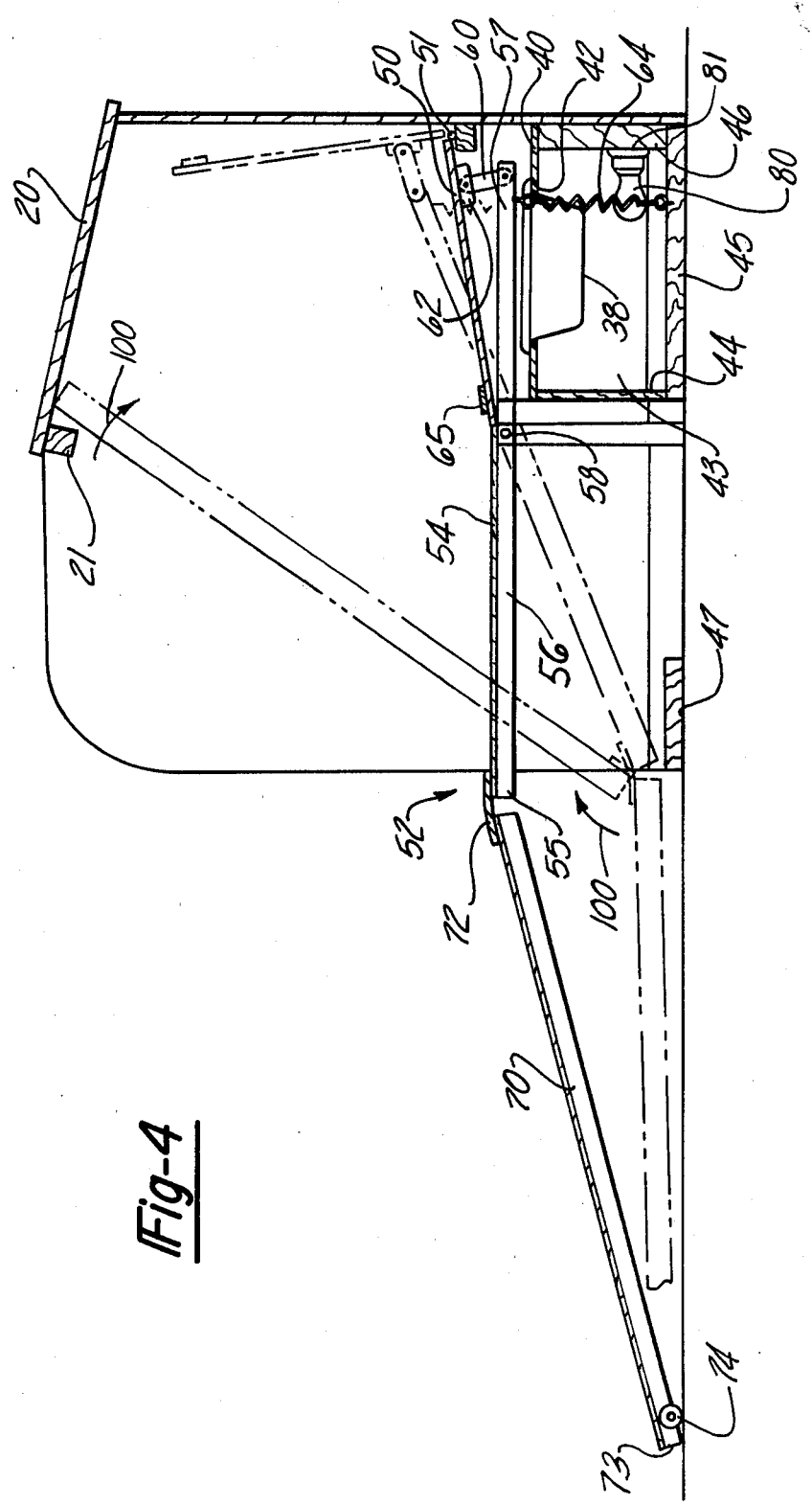
FIG. 4 is a sectional elevational taken substantially along the line 4—4 in FIG. 2.

Referring now to FIGS. 2 through 4, the feeding apparatus 10 includes a raised food support shelf 40 which is supported by braces 44 and 46 (See FIG. 4). The shelf 40 includes apertures 42 which receive the bottom of food bowls therethrough, the food bowls being supported by the rims of the bowls above the periphery of the aperture 42. The food shelf 40 is secured adjacent to the back wall 18 so that it is disposed underneath the top wall 20 of the housing 12. In addition, a food shelf cover 50 is pivotally secured by a hinge 51 near the back wall 18 so that it extends over the food shelf 40 in its first pivotal position. Weights 65 are secured to the cover 50 near its free edge to maintain the cover in its first closed position (shown in FIG. 2 and in solid line in FIG. 4). In its second pivotal position, the cover 50 is spaced away from the food shelf (shown in FIG. 3 and in phantom line in FIG. 4). A treadle mechanism 52 operates the food shelf cover 50, causing it to pivot from its first position to its second position when an animal enters the housing enclosure 12.

More particularly, the treadle mechanism 52 comprises a floor panel 54 secured across one end 55 of a pair of support arms 56. The arms 56 are pivotally secured about a transverse axis 58 extending between the walls 14 and 16 of the housing 12. The other end 57 of each arm 56 is pivotally secured to the end of a link member 60. The other end of each link 60 is pivotally secured to a flange 62 extending outwardly from the underside of the shelf cover 50. The flange 62 is secured near, but spaced apart from, the hinge 51. One end of a spring 64 is secured to the end 57 of an arm 56. The other end of the spring 64 is secured to a baseboard 45 secured at the bottom of the housing 12. The spring 64 urges the end 57 of the arm 56 downwardly so that the arm 56 is normally aligned in the position shown in solid line in FIG. 4.

A ramp member 70 is pivotally secured to the end of the floor panel 54 by a hinge means 72. As shown at FIG. 4, the ramp member 70 is normally inclined from the ground surface toward the normally raised end 55 of the arm 56, but can be depressed toward the ground as shown in phantom line in FIG. 4. Preferably, end 73 of the ramp member 70 includes rollers 74 which permit the end 73 of ramp member 70 to slide easily along the ground surface.

The framing members 44, 45 and 46 and the shelf member 40 enclose a chamber 43 between the side walls 14 and 16 into which the bowls 38 extend. Preferably, this chamber 43 includes heating means to prevent freezing of the liquid or solid foods contained in the bowls 38. In addition, the housing 12 preferably includes a lighting means so that the level of food in the bowl can be viewed regardless of light conditions outside of the housing 12. In the preferred embodiment of the present invention, the heating and lighting functions are accomplished by at least one incandescent light bulb 80. As shown in FIG. 4, the light bulb 80 is secured in a socket 81 secured to the framing member 46 and appropriate electrical circuitry (not shown) connects the light bulb 80 to an electrical power source (not shown) through the switch 85 (see FIGS. 2 and 3). Of course, since the light bulb 80 is disposed in the chamber 43, it is necessary to provide additional apertures in the shelf, or other means such as transparent food bowls 38, so that light is transmitted for illumination of the contents of the bowls 38. Nevertheless, it is to be understood that other light source locations are equally within the scope of the present invention so long as they serve to illuminate the contents of the food bowls 38. Likewise, other heating means are also within the scope of the present invention so long as heat is transferred to the contents of the food bowls 38.

The shelf member 40 is preferably removable to permit cleaning and replacement.

Having thus described the important structural features of the present invention, it is clear that the feeding apparatus of the present invention is well adapted for use in an outdoor area and its operation will be described with respect to that environment. The housing 12 is positioned on a ground surface and the spikes 28 are embedded in the ground surface through the apertures 26 in the lateral flanges 24. The ramp member 70 is extended outwardly from the housing 12 by pivoting it in the direction of the arrow 90 shown in FIG. 1. The spring 64 and the counterweights 65 secured at the edge of the shelf cover 50 serve to maintain the cover 50 in a closed position above the shelf 40. The arms 56 are, therefore, substantially horizontally aligned at the height of the pivotal axis 58. The ramp member 70 is, therefore, inclined as shown in solid line in FIG. 4, and extends from the ground surface at the end 73 to the end 55 of the arm 56 which supports a floor panel 54.

As the animal walks onto the ramp member 70, that panel 54 is depressed towards the ground surface as shown in phantom line in FIG. 4. Likewise, the end 55 of the arm 56 is depressed toward the ground surface, whereby the arms 56 pivot about the axis 58 and thereby raise the end 57 of the arms 56. As the end 57 is raised, it raises the link 60 which urges the cover 50 to pivot about the pivotal axis 51 and raises the cover 50 to the position shown in phantom line in FIG. 4 and in solid line in FIG. 3. Thus, the food in the bowls 38 is accessible to the animal. Since the food bowls 38 are supported by the shelf 40 which is raised above the ground surface, and since the end of the ramp member 70 and end portion 55 of arm 56 are in their lowermost positions, the food bowls 38 remain elevated at a level which is convenient for the animal to feed and which does not require the animal to crouch in order to eat.

When the animal has finished feeding, it merely steps away from the ramp member 70. When the weight of the animal has been removed from the ramp member 70 and the floor panel 54, the spring 64 urges the arm 56 into its substantially horizontal position. At the same time, the counterweights force the lid 50 to pivot toward the position shown in solid line in FIG. 4 and thereby cover the food bowls 38 supported by the shelf 40.

In order to determine whether the food bowls 38 are filled, it is only necessary to depress the ramp member 70, for instance by standing on the ramp member 70 so that the cover is pivoted away from the shelf 40 and exposes the food bowls. If it is necessary to view the food bowls 38 after dark, it is a simple matter to activate the easily accessible switch 85 to illuminate the bowls 38, which are preferably translucent. In cold weather, it can be desirable to leave the bulb 80 turned on so that the heat radiated from the bulb 80 warms the bottoms of the bowls 38 which extend through the apertures 42 in the shelf 40. Although in the preferred embodiment, the heat and light are provided by a single source for convenience, it is to be understood that other heating elements and other forms of lighting apparatus are equally within the scope of the present invention.

When it is desired to prevent the animal's access to the food bowls 38, or to transport the housing 12 to another location, the ramp member 70 is easily folded into the housing 12 in the following manner. The ramp member 70 is depressed so that the ramp member 70 and the end 55 of arm 56 are aligned in the position shown in phantom line in FIG. 4. The ramp member 70 is then pivoted about the hinge means 72 in the direction of the arrows 100 shown in FIG. 4 so that the ramp member 70 becomes aligned in the position shown in dotted line in FIG. 1. When the end 55 has been depressed so that it engages the brace 47, the end 73 of ramp member 70 easily clears the lip 21 at the edge of the edge of the top wall 20 and fits within the housing 12. After removal of the spikes 28 from the flanges 24, the housing 12 is easily lifted by the handle 22 and transported to another location.

It should be clear that with slight modifications means could be provided to automatically fill the bowls with food and/or water. Also the switch 85 could, if desired, be replaced with temperature sensing means which would automatically switch the light on when the temperature has dropped to a point where there is a danger of the food freezing.

Having thus described my invention, many modifications thereto will become apparent to those skilled in the art to which it pertains without departing from the scope and spirit of the present invention as defined in the appended claims.

What is claimed is:

1. An animal feeding apparatus for holding and protecting bowls of food comprising:
a housing having two side walls, a back wall and a top wall extending from said back wall;
a shelf and means for stationarily securing said shelf adjacent said back wall and under said top wall, said shelf including means for supporting at least one food bowl in said shelf;
a cover overlying said shelf;
means for pivoting said cover between a first position in which said cover overlays said shelf and a second position in which said cover is spaced apart from and thus exposes said shelf; and
treadle means for actuating said pivoting means, said treadle means comprising a floor panel pivotally secured about an axis substantially at the end of said panel, a flat ramp and hinge means for securing an end of said ramp to an end of said floor panel so that upon depression of said treadle means said ramp moves from a first inclined position extending outwardly from the housing to a second depressed position thereby moving said end of said ramp towards said housing, said ramp being manually pivotable about said hinge means to a third position substantially within said housing.

2. The invention as defined in claim 1 wherein said top wall includes a handle.

3. The invention as defined in claim 1 and further comprising heating means disposed below said shelf for heating said at least one bowl.

4. The invention as defined in claim 1 and further comprising lighting means for illuminating said at least one bowl.

5. The invention as defined in claim 3 or 4 wherein said last mentioned means comprises an incandescent light bulb.

6. The invention as defined in claim 1 wherein said pivoting means comprises means for normally maintaining said cover in its first position.

7. The invention as defined in claim 6 wherein said last mentioned means comprises weights secured to said cover.

8. The invention as defined in claim 6 wherein said last mentioned means comprises a spring.

9. The invention as defined in claim 1 and further comprising means for securing said feeding apparatus to a ground surface.

10. The invention as defined in claim 1 wherein said means for stationarily securing the shelf comprises means for removably securing the shelf to said housing.

11. An animal feeding apparatus for holding and protecting bowls of food comprising:
a housing having two side walls, a back wall and a top wall extending from said back wall;
a shelf and means for stationarily securing said shelf adjacent said back wall and under said top wall, said shelf including means for supporting at least one food bowl in said shelf;
a cover overlying said shelf;
means for pivoting said cover between a first position in which said cover overlays said shelf and a second position in which said cover is spaced apart from and thus exposes said shelf; and
treadle means for actuating said pivoting means, said treadle means comprising a floor panel pivotally secured about an axis substantially at the end of said panel, a flat ramp and hinge means for securing an end of said ramp to an end of said floor; and
further comprising lighting means for illuminating the bowl.

12. The invention as defined in claim 11 wherein said lighting means comprises said at least one food bowl being transparent and a light bulb.

13. An animal feeding apparatus for holding and protecting bowls of food comprising:
a housing having two side walls, a back wall and a top wall extending from said back wall;
a shelf and means for stationarily securing said shelf adjacent said back wall and under said top wall, said shelf including means for supporting at least one food bowl in said shelf;
a cover overlying said shelf;
means for pivoting said cover between a first position in which said cover overlays said shelf and a second position in which said cover is spaced apart from and thus exposes said shelf; and
treadle means for actuating said pivoting means, said treadle means comprising a floor panel pivotally secured about an axis substantially at the end of said panel, a flat ramp and hinge means for securing an end of said ramp to an end of said floor; and
wherein said top wall includes a handle for lifting and transporting the apparatus.

* * * * *